COUPLER FOR CONNECTING A PLURALITY OF LOAD PAIRS TO A SIGNAL SOURCE

Filed April 26, 1965

Inventor
John R. Winegard
By Frost, Burmeister & Kulie
Attorneys 3,349,345

COUPLER FOR CONNECTING A PLURALITY OF LOAD PAIRS TO A SIGNAL SOURCE

John R. Winegard, 3000 Kirkwood St., Burlington, Iowa 52601

Filed Apr. 26, 1965, Ser. No. 450,856
4 Claims. (Cl. 333—8)

The present invention relates in general to coupling circuits and more particularly to an improved low-loss, multicoupler device suitable for energizing two or more loads, such as television receivers, from a common source, such as a television antenna transmission line, while isolating each load from spurious voltages generated by others of the loads.

It is often desirable, if not necessary, to energize a plurality of television receivers or the like from a single, common antenna circuit. Efficient operation of the respective receivers requires that this be accomplished through circuitry that does not introduce significantly large losses of its own into the transmission system. Moreover, since each receiver has a local oscillator that serves as a source of radio frequency signals that may otherwise interfere with the operation of the other receivers, it is necessary to provide circuitry in the coupler to effectively isolate each of the receivers from each of the other receivers with respect to signal injected at the point of connection of each receiver to the coupler.

Further, in coupling devices of this type, there are at least two separate impedance match considerations which must be taken into account with respect to the desired signal. The first is "forward"—that is, from the coupling device to the antenna. The other is "backward"—from the coupling device to the associated receivers. The total loss from source to the receivers is determined by the effect of the two impedance match considerations in combination. A good match in one direction while effecting a poor match in the other direction results in an overall undesirable VSWR and therefore poor efficiency.

In accordance with the present invention, the receivers or other loads to be connected to the common antenna or other source are divided into associated pairs. Each pair of receivers is fed from the common source through an impedance transformer and a pair of high frequency coupling transformers, for example, ferrite core transformers. The impedance transformer has its input connected to the common source and its output serving as reference points or terminals. Each coupling transformer includes first and second like windings in the case of balanced loads. Connections are provided making a series circuit from one reference terminal through one winding of one of the transformers to one of the loads and from the same load through one winding of the other transformer to the other reference terminal.

Additional connections provide another series circuit from the one reference terminal through the other winding of the one transformer to the other of the loads of the load pair and from the same load through the other winding of the other transformer to the other reference terminal. Further in accordance with the present invention, impedance elements are connected across the otherwise disconnected ends of the transformer windings and the respective transformers are so arranged that the impedances provide a bridge action or null effect that increases the isolation between loads of a pair. The impedance transformer provides substantially an exact impedance match between the impedances of the respective loads as measured at the reference terminals and the impedance of the source.

With this circuitry, it has been found that by proper choice of the transformer impedance, it is possible to achieve a relatively high degree of isolation for each receiver or load from the other receivers or loads in the system. That is, each load is isolated from the other load of the same pair as well as the loads of any different pair, if present. There is a surprising and very important improvement in performance when the antenna impedance is substantially matched to the load impedance as seen by the antenna.

It is therefore a general object of the present invention to provide an improved low-loss coupler for energizing a plurality of loads from a common source, while isolating each load from spurious voltages generated by the other loads.

Another object of the present invention is to provide an improved low-loss coupler suitable for energizing a plurality of receivers from a common antenna wherein an effective impedance match is provided between the coupler and the antenna and also between the coupler and each associated receiver.

A more particular object of the present invention is to provide an improved low-loss coupler suitable for energizing a plurality of pairs of television receivers, or the like, from a single antenna transmission line or like source of radio frequency signals.

Still another object of the present invention is to provide a coupler suitable for connection to a 300 ohm twinline television signal source and effective to energize up to four 300 ohm television receivers without significant interaction between any such receiver and any of the other receivers.

Yet another object of the present invention is to provide an improved coupler for energizing a pair of loads from common input terminals in which balanced feed transformers and impedance connections between the loads of the pair coact to provide normal energy feed without substantial energy loss while providing effective isolation between loads.

Another and more particular object of the present invention is to provide a small size, inexpensive and yet highly efficient and effective coupler construction for connection to a 300 ohm television twin-lead transmission line and to the twin-lead transmission line leading to each of at least two television receivers, the coupler being so constructed and arranged that a high degree of isolation between each receiver and each of the other receivers is attained throughout the entire operating frequency range of the coupler device without recourse to resonant action, which device can be made to accommodate any number of pairs of receivers.

The novel features which I believe to be characteristic of my invention are set forth with particularity in the appended claims. My invention itself, however, both as to its organization and as to further objects and advantages thereof will best be understood from the following description, taken in conjunction with the accompanying drawing, in which:

Figures 1, 2, 3, 4, 5, 6, 7:
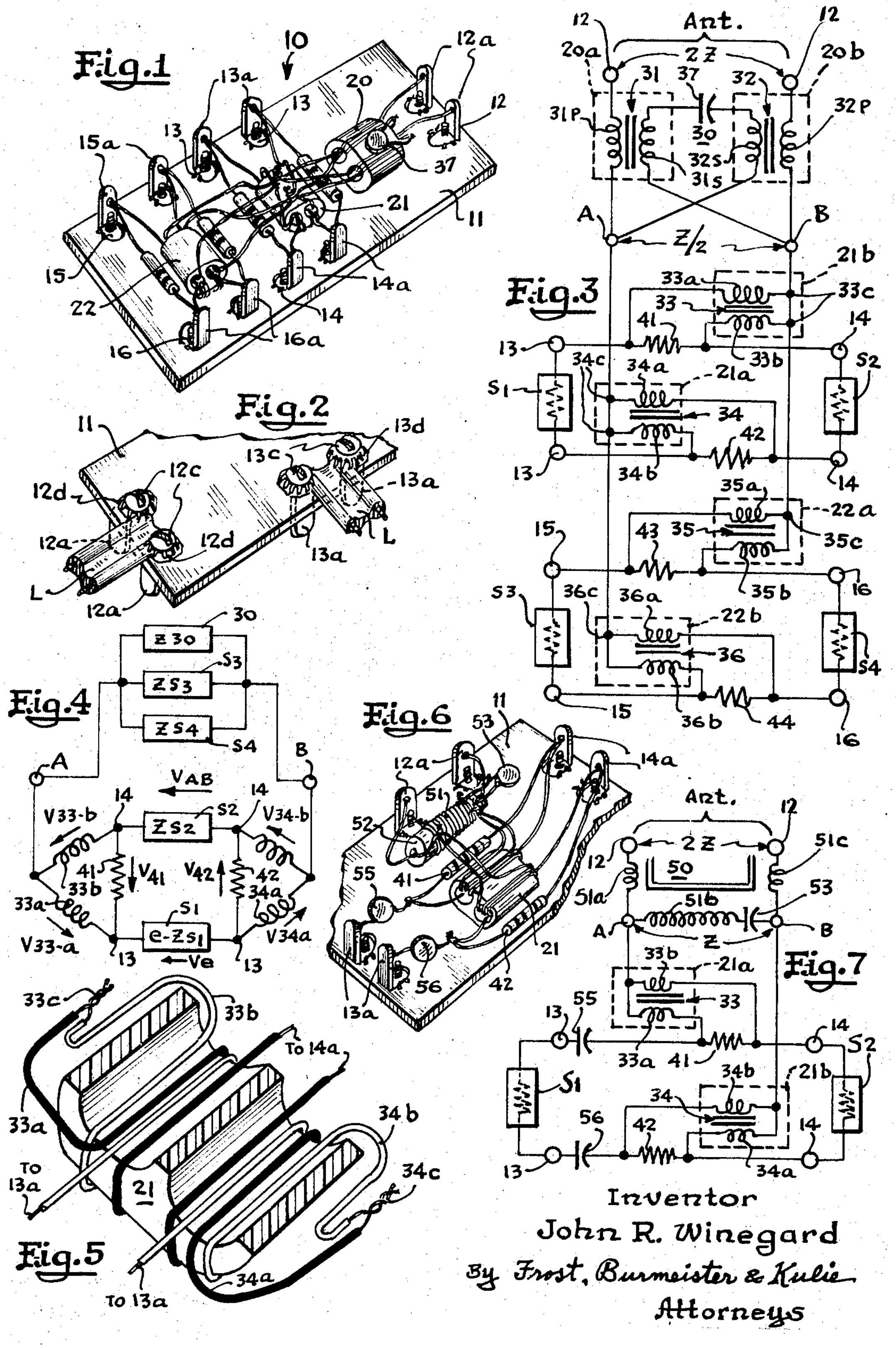
FIGURE 1 is a perspective view of a portion of a multicoupler device in accordance with one embodiment of the present invention.
FIGURE 2 is a fragmentary view in perspective of the underside of the base as shown in FIGURE 1.
FIGURE 3 is a schematic circuit diagram of the coupler device of FIGURE 1 with four receivers connected thereto.
FIGURE 4 is a simplified explanatory diagram of the circuit of FIGURE 3.
FIGURE 5 is a perspective view in partial cross section of a portion of a ferrite core showing the associated transformer winding detail thereon.
FIGURE 6 is a perspective view of a portion of a coupler device in accordance with another embodiment of the invention.
FIGURE 7 is a schematic diagram of the coupler device of FIGURE 6.

Referring now to FIGURE 1, a multicoupler device 10 in accordance with one embodiment of the present invention is shown which, in its preferred form, consists of a base 11 of a generally rectangular configuration. The base 11 is preferably formed from a Bakelite material or equivalent of approximately 2¼" by 3½" in size. A suitable cover (not shown) is provided to protect the assembled unit from dust, ice, snow and the like.

The base 11 serves as a mounting board for the various circuit components and connecting terminals. One such screw down terminal pair 12 serve for connecting the antenna line while four other screw-down terminal pairs 13, 14, 15, and 16 serve for connecting the four associated television receivers. The terminals 12, 13, 14, 15 and 16 include upstanding soldering lugs 12*a*, 13*a*, 14*a*, 15*a* and 16*a*, respectively, on the inside of the base 11 and, on the outside of the base, FIGURE 2, form seats against which the various transmission lines bear. Each of the screw terminals include an associated machine screw and a serrated washer. As shown in FIGURE 2, the terminals 12 include the machine screws 12*c* and the washers 12*d* while the terminals 13 include the screws 13*c* and the washers 13*d*. (The associated screws and washers for the remaining terminals 14, 15 and 16 are not shown.)

When connecting the twin-lead transmission line L to the terminals of the coupler 10, it is not necessary to strip off a portion of the insulation from the line. As may be seen in FIGURE 2, an end portion of the line L need only be inserted under the serrated washers 12*d* or 13*d* and the machine screws 12*c* or 13*c* tightened down sufficiently where the washers pierce the insulation and make contact with the internal conductors therein running along the longitudinal edges thereof.

The coupler 10 includes ferrite cores 20, 21 and 22 which serve as coil forms upon which the various impedance transformation devices are wound, as will be hereinafter described. The cores 20, 21 and 22 are of an elongated, generally rectangular configuration and composed of a suitable compressed ferrite material. In the form shown, the dimensions of the cores are approximately ½" wide by ½" long by ¼" thick. Each of the cores includes twin non-intersecting cylindrical bores therethrough of approximately ⅛" in diameter in the longitudinal axial direction so as to form two separate and distinct compartments for winding two associated but operationally independent transformer devices (best shown in FIGURE 5). More specifically, each of the two transformers wound on an associated ferrite core encompasses a separate volume of the ferrite material of the core such that the flux produced by one of the transformers will not materially interfere with the flux produced by the other transformer associated with the same core.

Each of the ferrite cores 20, 21 and 22 include a pair of associated impedance transformation devices, each of which includes a pair of windings. These windings are interconnected to the various soldering lugs 12*a*, 13*a*, 14*a*, 15*a* and 16*a*, respectively, to form the circuit as shown in FIGURE 3.

The ferrite core 20 includes a transformer 31 having a primary winding 31*p* and a secondary winding 31*s* and a transformer 32 having a primary winding 32*p* and a secondary winding 32*s*. The windings of the transformers 31 and 32 are interconnected to form an impedance transformation circuit 30 capable of effecting a 4:1 change in the impedance presented by the antenna connected to the terminals 12. The portion of the ferrite core 20 on which the transformer 31 is wound is indicated by the rectangle 20*a* in dotted line and the portion of the core 20 on which the transformer 32 is wound is indicated by the rectangle 20*b* in dotted line. The primary winding 31*p* is connected between one of the antenna terminals 12 and a reference terminal A while the primary winding 32*p* of the transformer 32 is connected between the other of the antenna terminals 12 and a reference terminal B. The respective secondary windings 31*s* and 32*s* are interconnected by a blocking capacitor 37 at one end thereof while the other ends of the windings 31*s* and 32*s* are cross-connected between the reference terminals A and B. That is, the secondary winding 31*s* is connected to the reference terminal B and the secondary winding 32*s* is connected to the reference terminal A. With the connections thus described, the transformers 31 and 32 form an effective and efficient impedance transformation circuit with a characteristic of offering little impedance to balanced currents therethrough but a relatively high impedance path to any unbalanced currents. With a characteristic impedance of Z for the transformers 31 and 32, the impedance between the antenna terminals 12 will be seen to be 2Z, while the impedance between the reference terminals A and B will be $Z/2$—hence a 4:1 impedance transformation ratio.

Each of the ferrite cores 21 and 22 include a pair of autotransformers, each of which includes a pair of identical windings. The core 21 includes the transformers 33 and 34 with winding pairs 33*a*–33*b* and 34*a*–34*b*, respectively. A center tap 33*c* of the autotransformer 33 is connected to the reference terminal B while a center tap 34*c* of the autotransformer 34 is connected to the reference terminal A. The transformer 33 is connected between one of the screw terminals 13 and one of the screw terminals 14 while the transformer 34 is connected between the other of the screw terminals 13 and the other of the screw terminals 14. A resistor 41 is connected in parallel with the transformer 33 and a resistor 42 is connected in parallel with the transformer 34.

Similarly, the ferrite core 22 includes the autotransformers 35 and 36, with the portion of the core on which the transformer 35 is wound being indicated by the rectangle 22*a* in dotted line and the portion of the core 22 on which the transformer 36 is wound being indicated by the rectangle 22*b* in dotted line. The transformer 35 includes a pair of windings 35*a*–35*b* and the transformer 36 includes a pair of windings 36*a*–36*b*. The transformer 35 is connected between one of the screw terminals 15 and one of the screw terminals 16 while the transformer 36 is connected between the other of the screw terminals 15 and the other of the screw terminals 16. A resistor 43 is connected in parallel with the transformer 35 and a resistor 44 is connected in parallel with the transformer 36.

The coupling circuit of FIGURE 3 is completed by the connection of four television receivers, indicated as S1, S2, S3 and S4, to the respective screw terminal pairs 13, 14, 15 and 16, as shown. It is to be understood, however, that less than four receiver sets may be employed with the coupler 10, in which case it is necessary to connect a resistance across each of the unused terminal pair having a value equivalent to the characteristic impedance of the receiver, or approximately 300 ohms.

In fabrication, the respective impedance transformation devices 31 to 36 are wound on the respective ferrite cores 20, 21 and 22 from 150 ohm small size twin-lead conductor. The fabrication details for the transformers 33 and 34 on the core 21 can be more clearly seen in FIGURE 5. It is to be understood that the transformers 31, 32, 34 and 36 are similarly wound on associated cores 20 and 22. With reference to FIGURE 5, it is seen that each of the windings of the transformers 33 and 34 includes one and one-half turns around the ferrite core 21. The winding 33*a*, shown as a black wire, is wound from the left to the right (clockwise) on the core 21 while the winding 33*b*, shown as a white wire, is wound from the right to the left (counterclockwise) on the core 21. Similarly, the winding 34*a*, a black wire, is wound clockwise on the core 21 while the winding 34*b*, a white wire, is wound counterclockwise.

The action of the coupler 10 in feeding each of the four loads can best be understood by reference to a single pair of loads, such as S1 and S2, as shown in FIGURE 4. When these have like terminal impedances across the terminals 13 and 14, respectively, the current flow to each of the loads is the same as the current flow to the other. It will be noted that current flows to the load S1 through the windings **33*a* and 34*a* of the transformers 33 and 34 and to the load S2 through the windings 33*b* and 34*b* of the transformers 33 and 34. Moreover, these windings are poled so that the resultant current flow to the load S1 produces a magnetomotive force in the cores of the transformers 33 and 34 equal and opposite the magnetomotive force caused therein by the current flow to the load S2. The consequence is that there is no net M.M.F. effective in the core of either transformer and therefore no induced voltage across any transformer winding. In theory, therefore, the loads S1 and S2** together act as if connected directly across the terminals A and B.

In actual fact, however, the loads and the transformer windings are never perfectly balanced. This is because there is always some leakage inductance in each transformer and some lack of impedance identity. There are other resistances and capacitances which affect operation. The losses and mismatch extending from each load to the reference terminals A and B are nevertheless small and a high degree of coupling efficiency is realized.

Since the loads S1, S2, S3 and S4 are in effect in parallel across the terminals A and B, the net load impedance is about one-fourth that of any single load. With a nominal 300 ohm impedance for the television receivers, this gives about 75 ohms as a load impedance between the reference terminals A and B, which is the same as presented to the terminals A and B by the impedance transformation circuit 30 when a nominal 300 ohm antenna is connected to the antenna terminals 12.

FIGURE 4 shows diagrammatically the various impedances and circuit connections of signifiance in understanding the practical operation of the isolation achieved with the coupler 10 of the present invention. Number symbols on this diagram correspond to the apparatus shown in FIGURES 1 and 3, but it should be understood that in some instances the actual apparatus is connected only indirectly so that the impedance values of FIGURE 4 do not necessarily mean the same impedance values as are measured across the terminals of the apparatus. For purposes of practical explanation, we shall assume that a spurious voltage *e* is generated in the load S1 which may, for example, be the voltage of a local oscillator in the television receiver constituting that load. This voltage will, of course, appear as a generated voltage "behind" an internal impedance $Z_{S1}$, FIGURE 4.

One circuit through which current flows as a consequence of the spurious signal voltage *e* may be traced through the winding **33*a* to the terminal A, from the terminal A to the terminal B, through the parallel impedances $Z_{30}$, $Z_{S3}$, and $Z_{S4}$, and through the winding 34*a*. The actual voltage appearing across the windings 33*a* and 34*a*** will be less than the value of the voltage *e* in an amount determined by the relative impedances in this series circuit. The direction of the voltages across the windings **33*a* and 34*a*** will be in opposition to the voltage *e*, which means that, with the voltage *e* as represented by the arrow $V_e$, the voltages across the windings **33*a* and 34*a*** are in the directions of the arrows $V_{33a}$ and $V_{34a}$, as shown.

Another circuit through which current flow may take place as a consequence of the spurious voltage *e* may be traced through the resistance 41, through the load S2, and through the resistance 42. The actual voltage appearing across the load S2 must equal the voltage at the terminals of the load S1 less the voltage drops of the resistance 41 and 42, provided these voltage drops are in the direction of the arrows $V_{41}$ and $V_{42}$. And if these voltages are equal to the terminal voltage of the load S1 due to the spurious voltage *e*, then no voltage will appear across the load S2 and perfect isolation is achieved.

The windings **33*b* and 33*a* are so poled as to give additive voltages when the loop defined by the winding 33*b*, the winding 33*a* and the resistance 41 is traced. Consequently, the voltage drop across the resistance 42 has the direction shown by the arrow $V_{42}$ and is equal to the sum of $V_{34b}$ and $V_{34a}$. The voltage across the load S2 is thus equal to the voltage across the terminals of the load S1, less the total voltage drop in all four transformer windings. By proper choice of the impedance of these windings in relation to the total impedance across the reference terminals A and B, it is thus possible to achieve a high degree of isolation of the load S2 from a spurious voltage appearing in the load S1. The same action, of course, takes place with respect to any spurious voltages appearing in the loads S2, S3 or S4**, so that each of the receivers is provided with theoretically perfect isolation in relation to the other receiver of the same receiver pair.

Effective isolation is also effected between any of the receivers and any receiver of a different receiver pair. Assuming again that there is a spurious voltage *e* behind the internal impedance $Z_{S1}$ of the load S1, it will be appreciated that this voltage appears across the terminals A and B as if "behind" the greater reactance value associated with the action of the transformers 33 and 34. There is a net reactance in each instance because the current flows in the respective pairs of windings are not balanced (and hence produce a net M.M.F. and hence impedance even though they produce opposed M.M.F.). The net effect is to make each load, acting as a source, appear across terminals A and B as "behind" an impedance at least equal to the internal load impedance (e.g. 300 ohms) and as a practical matter a much larger impedance value because of the action of the transformers. With $Z_{30}$ being about 75 ohms (based on a 4:1 impedance transformation ratio of a nominal 300 ohm antenna transmission line connected to the antenna terminals 12), and with $Z_{S3}$ and $Z_{S4}$ each being approximately 300 ohms, then the net impedance presented to the terminals A and B with respect to the impedances $Z_{30}$, $Z_{S3}$ and $Z_{S4}$ is about 50 ohms. The spurious voltage *e* thus appears across the reference terminals A and B as if "behind" an impedance of around 300 ohms (the receiver S1), plus the impedances of the windings **33*a* and 34*a*. The latter are significant because the current flows in the windings 33*a* and 33*b* and the windings 34*a* and 34*b*** are unequal so that a net M.M.F. is produced resulting in a substantial reactive impedance. This causes a relatively large impedance mismatch between the 50 ohm load as presented to the reference terminals A and B by the loads $Z_{30}$, $Z_{S3}$ and $Z_{S4}$ and the impedance of considerably more than 300 ohm load presented to the same terminals from "behind" the voltage *e*. Thus there is seen to be substantially more than a 6 to 1 impedance mismatch between the actual spurious voltage *e* and the voltage that appears across the other loads S3 and S4.

It should also be noted that with the use of the ferrite cores 20, 21 and 22, the number of turns required to effect efficient coupling is very small, viz., one and one-half turns for each winding of the transformers 31 to 36. See FIGURE 5.

In the foregoing embodiment described, an isolation figure of at least 12 db was obtained between any receiver set on any television channel and any other connected receiver set. An input VSWR of 1.15:1 was observed with an output VSWR of 1.4:1. Insertion loss was found to be approximately −6.23 db (compared to a theoretical perfect loss of −6.0 db for a four-set coupler device as considered here.) While measurements of this sort involve some inaccuracies, the results are indicative of the performance attainable.

Another embodiment of the present invention is shown in FIGURE 6. In this case a multicoupler device is shown for coupling a pair of receivers to a common antenna. In this embodiment, an impedance transformation circuit 50 is provided to effect a 2:1 change in the impedance presented by an antenna (not shown) connected to the terminals 12. The circuit 50 includes an impedance coil 51 wound on a cylindrical core 52 of ferrite material. The coil 51 includes twelve complete turns on the core 52 with a pair of intermediate tap points serving as reference terminals A and B as described in conjunction with FIGURE 3 as well as forming three separate windings 51*a*, 51*b* and 51*c*, respectively. A blocking capacitor 53 is electrically interposed between the winding 51*b* and the winding 51*c*. The windings 51*a* and 51*c* include two complete turns on the ferrite core 52 while the winding 51*b* includes eight complete turns, or twice that of the windings 51*a* and 51*c* combined. With the coil 51 connected between the terminals 12 as shown in FIGURES 5 and 6, a 2:1 impedance change is effected to transform a nominal 300 ohm antenna impedance presented to the terminals 12 into approximately 150 ohms at the reference terminals A and B.

The coupler in the embodiment of FIGURES 6 and 7 is completed by connecting a balanced circuit between the reference terminals A and B as shown schematically in FIGURE 7, which circuit is similar to that shown in FIGURE 3 comprising the pair of autotransformers 33 and 34 wound on the ferrite core 21 and the resistors 41 and 42. In the circuit of FIGURE 7, the winding 33*a* of the transformer 33 is connected to one of the terminals 13 through a blocking capacitor 55 while the winding 34*b* of the transformer 34 is connected to the other of the terminals 13 through a blocking capacitor 56. In all other respects, the circuit of FIGURE 7 is the same as its counterpart shown in FIGURE 3. The balanced circuit is completed by the connection of a pair of television receivers S1 and S2 to the screw terminals 13 and 14 as previously described.

With the receivers S1 and S2 in FIGURE 7 essentially connected in parallel with one another, approximately 150 ohms is presented to the reference terminals which matches the load impedance presented to the same terminals by the circuit 50, thereby effecting an impedance match between the coupler and the associated receivers.

Isolation of the television receivers of FIGURE 7 is effected in the same manner as previously described for the receiver pairs shown in FIGURE 3. In this embodiment, an isolation figure of 22 db was obtained between receivers on any television channel in the VHF band. A measured VSWR of 1.2:1 was observed both input and output. Insertion loss approximated −3.2 db (compared with a theoretical perfect loss of −3.0 db for a two-set coupler).

The system of the present invention provides performance that is very much better than has heretofore been possible. It has been found that with the specific system of the present invention the degree of impedance matching between the antenna and the respective receivers is critical. This is contrary to the usual situation in communications circuits. Ordinarily, performance varies only slightly from peak performance as the degree of mismatch varies from the matched condition. With the apparatus of the present invention, however, a relatively small mismatch results in a rather substantial degradation of performance. To ensure optimum performance, the impedance transformation device connected to the source terminals provides substantially an exact impedance match between the impedance of the common television antenna and the impedances of the respective receivers as measured at the reference terminals.

While only two embodiments of the present invention are shown and described herein, it will be understood that certain modifications may be effected without materially departing from the true scope of the invention. It will be understood that the appended claims are intended to cover all modifications and alternative constructions within their true spirit and scope.

What is claimed is:

1. A low-loss coupler for connecting a pair of loads each having first and second terminals in substantially isolated relationship to each other while feeding the same from a signal source, comprising in combination:

impedance transformation means having a pair of input terminals and first and second output reference terminals;

means connecting said input terminals of said impedance transformation means to said source;

a first transformer means having first and second windings on a common magnetic core;

a second transformer means having first and second windings on a common magnetic core;

means defining a first series circuit from the first reference terminal through the first winding of the first transformer means, to the first input terminal of one load and from the second input terminal of said one load through the first winding of the second transformer to the second reference terminal;

means defining a second series circuit from the first reference terminal through the second winding of the first transformer means, to the first input terminal of the other load and from the second input terminal of the said other load through the second winding of the second transformer means to the second reference terminal, the respective windings of said first and second transformer means being so poled that current flow through said first series circuit produces a magnetomotive force in each of said associated cores substantially equal and opposite to the magnetomotive force produced in each of said associated cores due to the current flow through said second series circuit;

impedance means connecting the first input terminals of the respective loads;

impedance means connecting the second input terminals of the respective loads;

the respective windings of said first and second transformer means being further poled to produce voltage drops of like sense across each of said impedance means as the circuit is traced from one load through the other load, said impedance transformation means producing substantially an exact impedance match between the impedance of the loads as measured at the reference terminals and the impedance of the source.

2. A low-loss coupler for connecting a plurality of load pairs each having a predetermined impedance and first and second input terminals in substantially isolated relationship to each other while feeding the same from a signal source, comprising in combination:

impedance transformation means having a pair of input terminals and first and second output reference terminals;

means connecting said input terminals of said impedance transformation means to said source;

first and second transformers for each load pair, each transformer having first and second windings on a common magnetic core;

means defining a first series circuit with each load pair from the first reference terminal through the first winding of the first transformer of each load pair to the first input terminal of one load of each load pair, and from the second input terminal of the said one load of each load pair through the first winding of the second transformer of each load pair to the second reference terminal;

means defining a second series circuit with each load pair from the first reference terminal through the second winding of the first transformer of each load pair to the first input terminal of the other load of each load pair, and from the second input terminal of the said other load of each load pair through the second winding of the second transformer of each load pair to the second reference terminal, the respective windings of said first and second transformers of each load pair being so poled that current flow through the first series circuit of each load pair produces a magnetomotive force in each of said associated magnetic cores substantially equal and opposite to the magnetomotive force in each of said cores due to the current flow through the second series circuit of each load pair;

impedance means connecting the first input terminals of the respective loads of each load pair;

impedance means connecting the second input terminals of the respective loads of each load pair;

said transformer windings of each load pair being further poled to produce voltages of like sense across each of said impedance means as the circuit is traced from one load through the other load in each load pair, said impedance transformation means producing substantially an exact impedance match between the impedance of the loads as measured at the reference terminals and the impedance of the source.

3. A low-loss coupler for connecting four 300 ohm receivers each having first and second input terminals in substantially isolated relationship to each other while feeding the same from a 300 ohm radio frequency source, comprising in combination:

impedance transformer means capable of effecting a 4:1 impedance step down and having first and second output terminals and a pair of input terminals;

means connecting said input terminals of said impedance transformer means to said source;

first and second transformers for each pair of two receivers, each transformer having first and second windings on a common magnetic core;

means defining a first series circuit in conjunction with each receiver pair as traced from the first output terminal through the first winding of the first transformer of each receiver pair, to the first input terminal of one receiver of each receiver pair and from the second input terminal of said one receiver through the first winding of the second transformer of each receiver pair to the second output terminal;

means defining a second series circuit in conjunction with each receiver pair as traced from the first output terminal through the second winding of the first transformer of each receiver pair, to the first input terminal of the other receiver of each receiver pair and from the second input terminal of said other receiver through the second winding of the second transformer of each receiver pair to the second output terminal, the respective windings of said first and second transformers of each receiver pair being so poled that the current flow through the first series circuit of each receiver pair produces a magnetomotive force in each of said associated cores substantially equal and opposite to the magnetomotive force in said cores due to the current flow through the second series circuit of each receiver pair;

a resistance of approximately 300 ohms connecting the first input terminals of each receiver pair;

a resistance of approximately 300 ohms connecting the second input terminals of each receiver pair;

said windings of said first and second transformers of each receiver pair being further poled to produce voltage drops of like sense across each of said resistances as the circuit is traced from one receiver to the other receiver in each receiver pair, said impedance transformer means producing substantially an exact impedance match between the impedance of the receivers as measured at the output terminals and the impendance of the source.

4. In a coupling device for connecting a pair of loads to a common source, means for effecting isolation between the loads, including in combination:

a support;

two spaced rows of complementary upstanding terminals in rectangular array on said support forming first and second terminal pairs, each terminal pair being adapted to receive connections to one of the loads;

impedance transformation means having a pair of input terminals and first and second output reference terminals;

means connecting said input terminals of said impedance transformation means to said source;

a ferrite core having first and second winding portions each linked by a closed flux path;

two pairs of windings wound on said ferrite core and linking said flux paths, respectively, each pair of said windings having a first and a second winding, the first winding of one pair of windings being traced from the first reference terminal around the first portion of said ferrite core one and one-half turns in a clockwise direction to one terminal of said first terminal pair, the second winding of the said one pair of windings being traced from the first reference terminal around the first portion of said ferrite core one and one-half turns in a counterclockwise direction to one terminal of said second terminal pair complementary to said one terminal of said first terminal pair, the first winding of the other pair of windings being traced from the second reference terminal around the said portion of said ferrite core one and one-half turns in a clockwise direction to the other terminal of said first terminal pair, the second winding of the said other pair of windings being traced from the second reference terminal around the said portion of said ferrite core one and one-half turns to a counterclockwise direction to the other terminal of said second terminal pair, said respective windings having end leads that span the space between the terminals in substantially straight line confiuration and support the ferrite core;

a first resistor connected between said one terminal of said first terminal pair and said one terminal of said second terminal pair in substantially straight line configuration; and a second resistor connected between said other terminal of said first terminal pair and said other terminal of said second terminal pair in substantially straight line configuration, said impedance transformation means producing substantially an exact impedance match between the impedance of the loads as measured at the reference terminals and the impedance of the source.

References Cited

UNITED STATES PATENTS 2,239,002 4/1941 Hall ---------------- 307—32

HERMAN KARL SAALBACH, *Primary Examiner.*

M. NUSSBAUM, *Assistant Examiner.*